(12) United States Patent
Itakura

(10) Patent No.: US 10,657,510 B2
(45) Date of Patent: May 19, 2020

(54) SALES DATA PROCESSING APPARATUS AND COMPUTER-READABLE STORAGE MEDIUM

(71) Applicant: CASIO COMPUTER CO., LTD., Shibuya-ku, Tokyo (JP)

(72) Inventor: Katsuyuki Itakura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 203 days.

(21) Appl. No.: 15/981,493

(22) Filed: May 16, 2018

(65) Prior Publication Data
US 2018/0336540 A1 Nov. 22, 2018

(30) Foreign Application Priority Data
May 19, 2017 (JP) .................. 2017-099401

(51) Int. Cl.
*G06Q 20/20* (2012.01)
*G07G 1/00* (2006.01)
(Continued)

(52) U.S. Cl.
CPC ............ *G06Q 20/20* (2013.01); *G06F 21/60* (2013.01); *G06Q 20/209* (2013.01);
(Continued)

(58) Field of Classification Search
None
See application file for complete search history.

(56) References Cited

U.S. PATENT DOCUMENTS

2002/0020743 A1   2/2002   Sugukawa et al.
2013/0346027 A1   12/2013  St. George et al.
(Continued)

FOREIGN PATENT DOCUMENTS

EP   2996095 A1   3/2016
JP   2001177669 A  6/2001
(Continued)

OTHER PUBLICATIONS

Japanese Office Action dated Sep. 19, 2019 (and English translation thereof) issued in Japanese Patent Application No. 2017-099401.
(Continued)

*Primary Examiner* — Paul Danneman
(74) *Attorney, Agent, or Firm* — Holtz, Holtz & Volek PC

(57) ABSTRACT

A sales data processing apparatus includes the following. A narrow area communication unit communicates with a predetermined terminal apparatus by wireless communication limited to a narrow area. A wide area communication unit communicates with the terminal apparatus by wireless communication throughout a wide area. A mode switching unit switches between a first mode in which wireless communication with the terminal apparatus using the narrow area communication unit is allowed but the wireless communication using the wide area communication unit is prohibited, and a second mode in which at least wireless communication using the wide area communication unit is allowed. A report mode which outputs sales data calculating predetermined transaction data is assigned to the first mode.

15 Claims, 13 Drawing Sheets

(51) Int. Cl.
*G06Q 20/32* (2012.01)
*G06F 21/60* (2013.01)
*H04W 76/10* (2018.01)

(52) U.S. Cl.
CPC ....... *G06Q 20/3278* (2013.01); *G07G 1/0009* (2013.01); *G07G 1/0018* (2013.01); *H04W 76/10* (2018.02)

(56) References Cited

U.S. PATENT DOCUMENTS

2014/0067569 A1* 3/2014 Katabira .............. G06Q 20/202
705/21
2017/0364887 A1  12/2017 Dullings et al.

FOREIGN PATENT DOCUMENTS

| JP | 2002063652 A | 2/2002 |
|---|---|---|
| JP | 2003187163 A | 7/2003 |
| JP | 2004185492 A | 7/2004 |
| JP | 2012137979 A | 7/2012 |
| JP | 2015204010 A | 11/2015 |

OTHER PUBLICATIONS

Extended European Search Report (EESR) dated Aug. 8, 2018 issued in counterpart European Application No. 18172933.6.

* cited by examiner

FIG.7

| | MODE | STEP1 | STEP2 | STEP3 |
|---|---|---|---|---|
| M1 | READ MODE | TURN OFF NARROW AREA COMMUNICATION UNIT AND WIDE AREA COMMUNICATION UNIT (S11) | PERFORM READ PROCESS (S12) | — |
| M2 | REFUND MODE | TURN OFF NARROW AREA COMMUNICATION UNIT AND WIDE AREA COMMUNICATION UNIT (S21) | PERFORM REFUND PROCESS (S22) | — |
| M3 | CALCULATOR MODE | TURN OFF NARROW AREA COMMUNICATION UNIT AND WIDE AREA COMMUNICATION UNIT (S31) | PERFORM CALCULATOR PROCESS (S32) | — |
| M4 | OFF MODE | TURN OFF NARROW AREA COMMUNICATION UNIT AND WIDE AREA COMMUNICATION UNIT (S41) | PERFORM PROCESS OF TURNING OFF SALES DATA PROCESSING APPARATUS (S42) | — |
| M5 | REGISTER MODE | TURN ON WIDE AREA COMMUNICATION UNIT AND TURN OFF NARROW AREA COMMUNICATION UNIT (S51) | PUT SALES DATA PROCESSING APPARATUS IN COMMUNICABLE STATE WITH ORDER ENTRY APPLICATION AND OUTPUT BEACON OF WIDE AREA COMMUNICATION UNIT (S52) | HANDLE REQUEST SENT FROM PORTABLE TERMINAL AND MANUAL REGISTRATION AT THE SAME TIME (S53) |
| M6 | REPORT MODE | TURN ON NARROW AREA COMMUNICATION UNIT AND TURN OFF WIDE AREA COMMUNICATION UNIT (S61) | PUT SALES DATA PROCESSING APPARATUS IN COMMUNICABLE STATE WITH REPORT APPLICATION AND OUTPUT BEACON OF NARROW AREA COMMUNICATION UNIT (S62) | AFTER HANDLING MANUAL REPORTING, SEND SALES DATA TO REPORT APPLICATION INSTALLED IN PORTABLE TERMINAL (S63) |
| M7 | PROGRAM MODE | TURN ON NARROW AREA COMMUNICATION UNIT AND TURN OFF WIDE AREA COMMUNICATION UNIT (S71) | PUT SALES DATA PROCESSING APPARATUS IN COMMUNICABLE STATE WITH PROGRAM APPLICATION AND OUTPUT BEACON OF NARROW AREA COMMUNICATION UNIT (S72) | HANDLE EITHER REQUEST SENT FROM PORTABLE TERMINAL OR MANUAL PROGRAMMING (S73) |

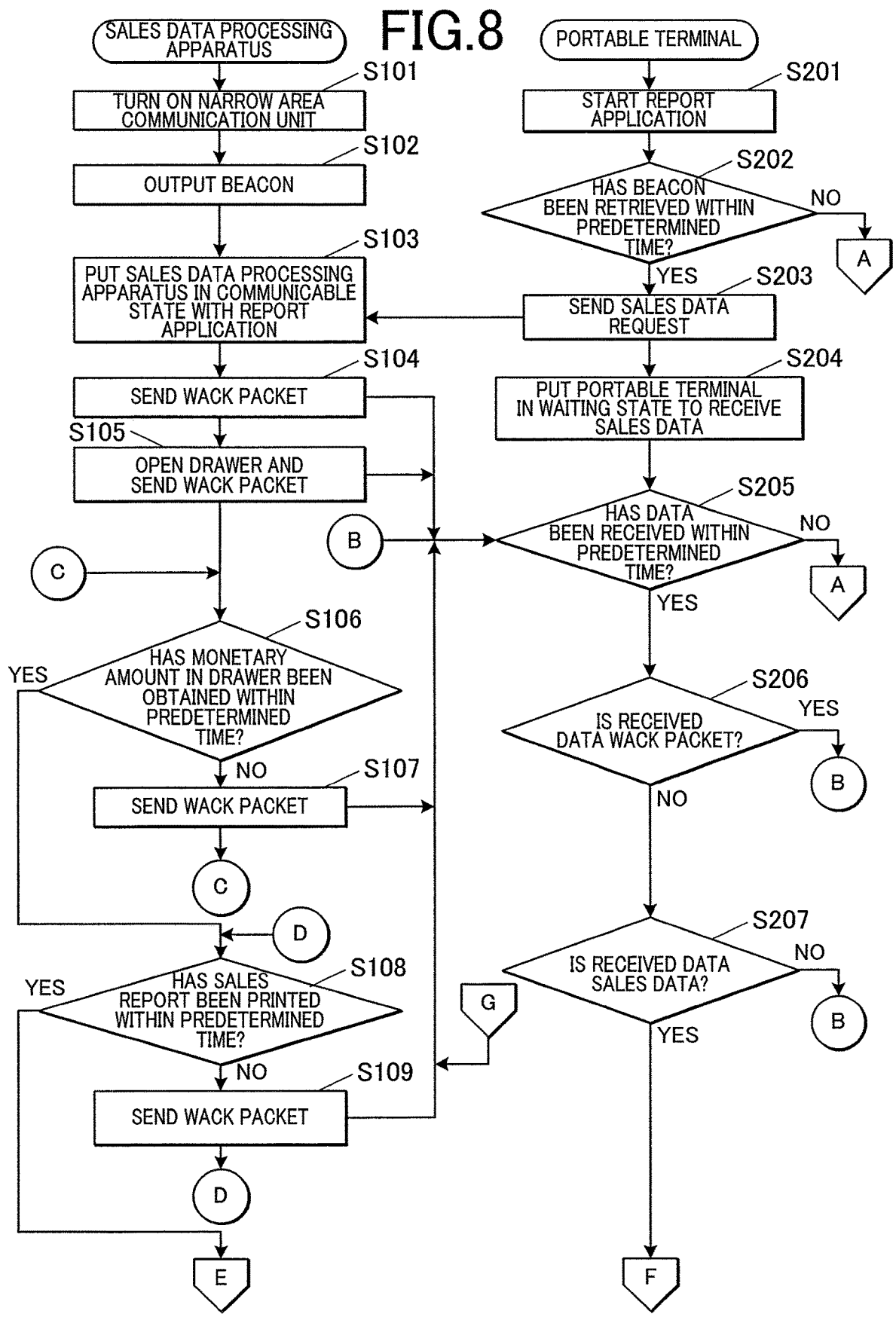

FIG.11

```
REPORT    2013-07-31 10:53
                         0001-000048
0000 DAILY DETAIL            Z 0002
DEPARTMENT 01           505 ITEM(S)
    44.04%                  ¥231,167
DEPARTMENT 02           411 ITEM(S)
    39.75%                  ¥208,689
DEPARTMENT 03            32 ITEM(S)
    2.72%                    ¥14,297
NON-LINK                 13 ITEM(S)
    1%                        ¥5,283
------------------------------------
GROSS SALES AMOUNT     1060 ITEM(S)
                         ¥524,966
NET SALES AMOUNT        158 COUNT(S)
                         ¥498,747
CASH IN DRAWER AMOUNT    ¥405,361
CHECK IN DRAWER AMOUNT      ¥2.890
CHARGE IN DRAWER AMOUNT    ¥37,405
TOTAL TAXABLE AMOUNT      ¥330,584
TAX AMOUNT       5.0%      ¥15,742
TOTAL NONTAXABLE AMOUNT   ¥153,051
TEN-THOUSAND YEN         17 BILL(S)
SERVICE                       ¥376
CANCELLED TRANSACTION  2 COUNT(S)
                              ¥297
REFUND MODE              1 COUNT(S)
                             ¥6,372
CALCULATOR              18 COUNT(S)
RECEIPT  REVENUE STAMP   1 COUNT(S)
                            ¥36,372
RECEIPT                  2 COUNT(S)
                            ¥23,563
------------------------------------
DIFFERENCE                    ¥100
```

361

SALES DATA PROCESSING APPARATUS AND COMPUTER-READABLE STORAGE MEDIUM

CROSS-REFERENCE TO RELATED APPLICATIONS

This application is based upon and claims the benefit of priority from the prior Japanese Patent Application No. 2017-099401 filed on May 19, 2017, the entire contents of which are incorporated herein by reference.

BACKGROUND OF THE INVENTION

1. Field of the Invention

The present invention relates to a sales data processing apparatus and a computer-readable storage medium.

2. Description of the Related Art

There is known a conventional sales data processing apparatus, such as an ECR (Electronic Cash Register), which is set in a store where items are sold, and registers therein transaction data including monetary amounts of items and the number of items that have been sold to customers.

There is disclosed, for example, in Japanese Patent Application Publications No. 2002-63652 and No. 2004-185492, a sales data processing apparatus as described above having a communication unit that establishes wireless communication with a terminal apparatus (portable terminal), such as a smartphone, thereby being able to send/receive information to/from the terminal apparatus.

Such a conventional sales data processing apparatus has various modes, such as a program mode to program (set) unit prices of items, a menu and so forth, a register mode to register sales, and a report mode to report (and reset) sales. The conventional sales data processing apparatus is used by an operator (store clerk) or an owner selecting a mode suitable for a purpose.

For example, the conventional sales data processing apparatus performs, in the report mode, a process of printing a sales report obtained by aggregating transaction data on the day.

SUMMARY OF THE INVENTION

According to a first aspect of the present invention, there is provided a sales data processing apparatus including: a narrow area communication unit which communicates with a predetermined terminal apparatus by wireless communication limited to a narrow area; a wide area communication unit which communicates with the terminal apparatus by wireless communication throughout a wide area; and a mode switching unit which switches between a first mode in which wireless communication with the terminal apparatus using the narrow area communication unit is allowed but the wireless communication using the wide area communication unit is prohibited, and a second mode in which at least wireless communication using the wide area communication unit is allowed, wherein, a report mode which outputs sales data calculating predetermined transaction data is assigned to the first mode.

According to a second aspect of the present invention, there is provided a sales data processing apparatus including: a controller which switches wireless communication with a predetermined terminal apparatus between a first mode in which wireless communication is performed using a narrow area communication unit which performs wireless communication limited to a narrow area and a second mode in which wireless communication is performed using a wide area communication unit which performs wireless communication throughout a wide area, wherein, a report mode which outputs sales data calculating predetermined transaction data is assigned to the first mode.

According to a third aspect of the present invention, there is provided a non-transitory computer-readable storage medium having a program stored thereon for controlling a computer used in a sales data processing apparatus, wherein the program controls the computer to perform the following process: a control process in which wireless communication with a predetermined terminal apparatus is switched between a first mode in which wireless communication is performed using a narrow area communication unit which performs wireless communication limited to a narrow area and a second mode in which wireless communication is performed using a wide area communication unit which performs wireless communication throughout a wide area, wherein, a report mode which outputs sales data calculating predetermined transaction data is assigned to the first mode.

BRIEF DESCRIPTION OF THE DRAWINGS

The accompanying drawings, which are incorporated in and constitute apart of the specification, illustrate embodiments of the invention, and together with the general description given above and the detailed description of the embodiments given below, serve to explain the principles of the invention, wherein:

FIG. 7 shows action in each mode of the sales data processing apparatus;

FIG. 8 is a flowchart showing action in a report mode;

FIG. 11 shows an example of a printed sales report;

DETAILED DESCRIPTION OF THE PREFERRED EMBODIMENTS

Hereinafter, one or more embodiments of the present invention are described in detail with reference to the drawings.

[1. Configuration]

[1-1. Configuration of System]

A configuration of a sales data processing system 1 according to an embodiment(s) is described.

Figure 1:
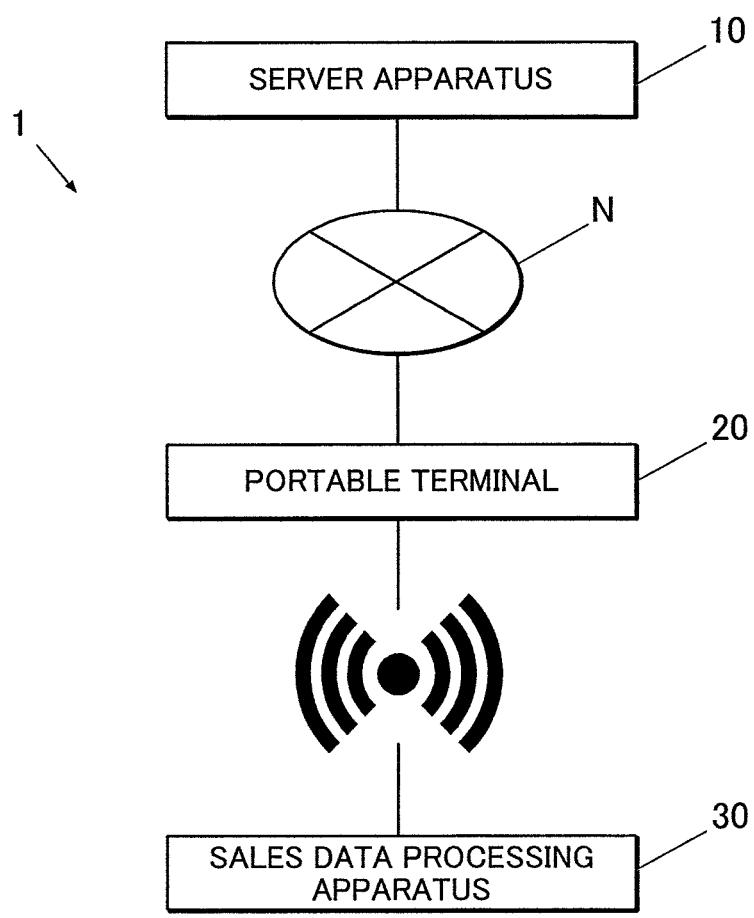
FIG. 1 is a connection diagram showing a schematic configuration of a sales data processing system according to one or more embodiments of the present invention.

As shown in FIG. 1, the sales data processing system 1 includes a server apparatus 10, at least one portable terminal (terminal apparatus) 20 and at least one sales data processing apparatus 30. The server apparatus 10 and the portable terminal 20 are connected to a communication network N. The communication network N herein is the Internet, but may be another network, such as a LAN (Local Area Network). The portable terminal 20 and the sales data processing apparatus 30 perform narrow area wireless communication, such as Bluetooth®, or wide area wireless communication, such as Wi-Fi®.

The server apparatus 10 is a server apparatus on a cloud, and manages, for example, transaction data on items sent from the sales data processing apparatus 30 via the portable terminal 20.

The portable terminal 20 is a portable terminal apparatus, such as a smartphone, and sends, to the server apparatus 10, for example, the transaction data on items sent from the sales data processing apparatus 30. The portable terminal 20 has various applications (e.g. a program application, an order entry application (i.e. a register application), a report application, etc.) installed therein to realize functions of predetermined modes (e.g. a program mode, a register mode, a report mode, etc.) of the sales data processing apparatus 30 by wireless communication with the sales data processing apparatus 30.

The sales data processing apparatus 30 is an ECR or the like set in a store, such as a privately-run store, a supermarket or an eating establishment, to register, by operator operations, the transaction data, such as monetary amounts of items and the number of items sold to or provided for customers. In a store, at least one sales data processing apparatus 30 is set. The server apparatus 10 can manage the transaction data of a plurality of stores in an integrated fashion.

[1-2. Configuration of Portable Terminal]

A configuration of the portable terminal 20 is described.

Figure 2:
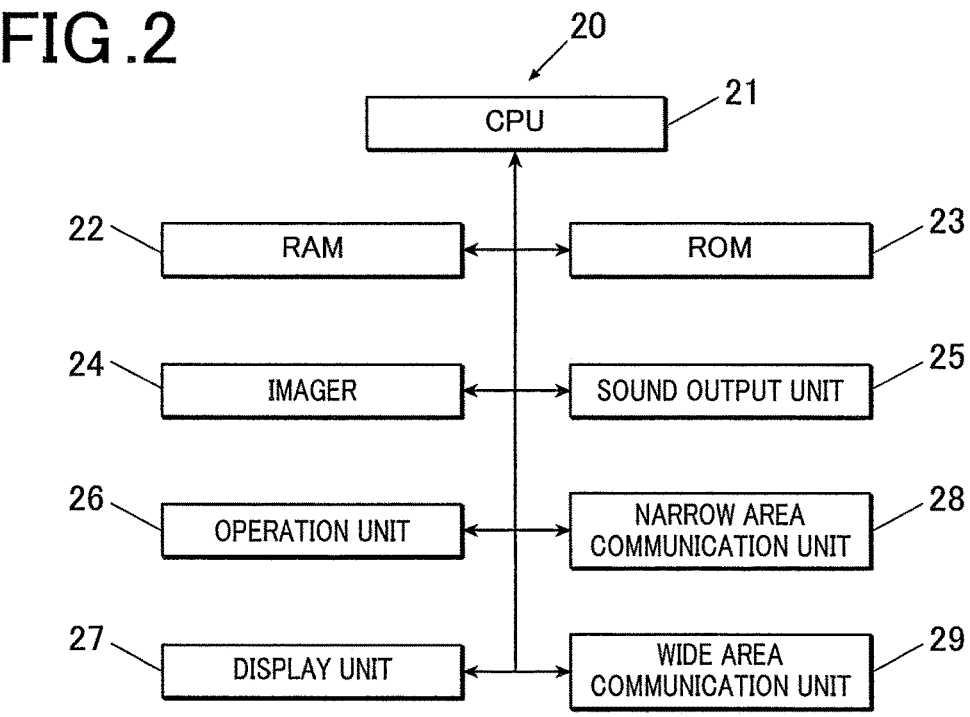
FIG. 2 is a block diagram showing a main-control configuration of a portable terminal.

As shown in FIG. 2, the portable terminal 20 includes a CPU 21, a RAM 22, a ROM 23, an imager 24, a sound output unit 25, an operation unit 26, a display unit 27, a narrow area communication unit 28 and a wide area communication unit 29.

The CPU 21 controls the components of the portable terminal 20. The CPU 21 reads a specified program(s) among various programs from the ROM 23, opens the read program (s) in the RAM 22, and performs a process (es) among various processes in cooperation with the opened program(s).

The RAM 22 is, for example, a volatile semiconductor memory, and forms a work area to store various data and programs.

The ROM 23 is a read only memory to store various data and various programs. The RAM 23 stores therein a system program(s), various application programs, such as the program application, the register application and the report application, that are executed by the CPU 21, a Web browser(s), data necessary for execution of these programs, and so forth.

The imager 24 images a subject in response to a user operation(s) and generates image data.

The sound output unit 25 includes a D/A convertor, an amplifier and a speaker, and converts sound data output from the RAM 22 or the ROM 23 into analog sound signals, thereby outputting sound.

The operation unit 26 includes: a key input unit including a home button; and a touchscreen integrated with the display unit 27, and accepts operation inputs from a user and outputs operation signals corresponding to the operation inputs to the CPU 21.

The display unit 27 includes a display, such as an LCD (Liquid Crystal Display) or an FPD (Flat Panel Display) using organic EL (Electro Luminescence) elements, and displays images based on display control signals output from the CPU 21 on its display screen.

The narrow area communication unit 28 includes an antenna, a demodulating circuit and a signal processing circuit, and performs narrow area wireless communication with the sales data processing apparatus 30 by a wireless communication system such as Bluetooth®.

The wide area communication unit 29 includes an antenna, a demodulating circuit and a signal processing circuit, and performs wide area wireless communication with the sales data processing apparatus 30 by a wireless communication system such as Wi-Fi®.

[1-3. Configuration of Sales Data Processing Apparatus]

A configuration of the sales data processing apparatus 30 is described.

Figure 3:
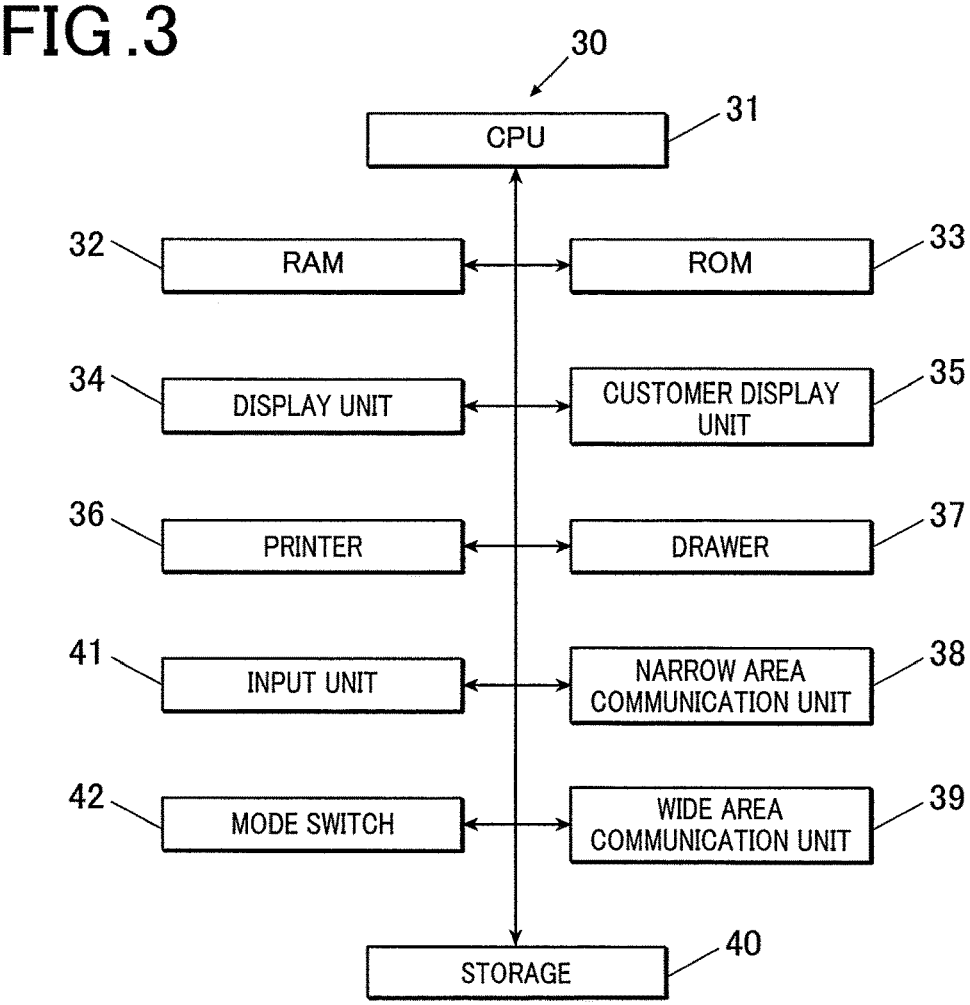
FIG. 3 is a block diagram showing a main-control configuration of a sales data processing apparatus.
Figure 4A:
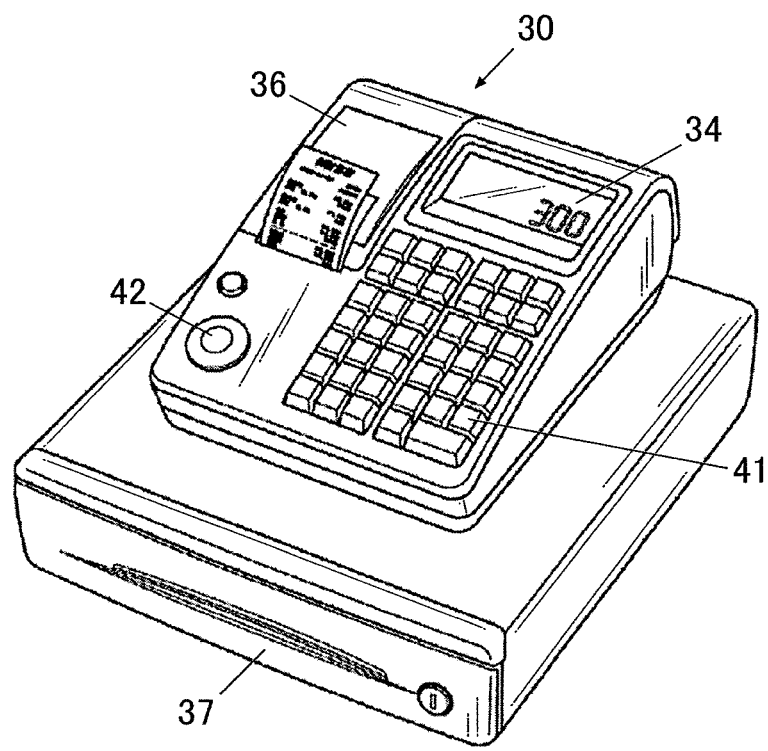
FIG. 4A and FIG. 4B are external views showing a schematic configuration of the sales data processing apparatus.
Figure 4B:
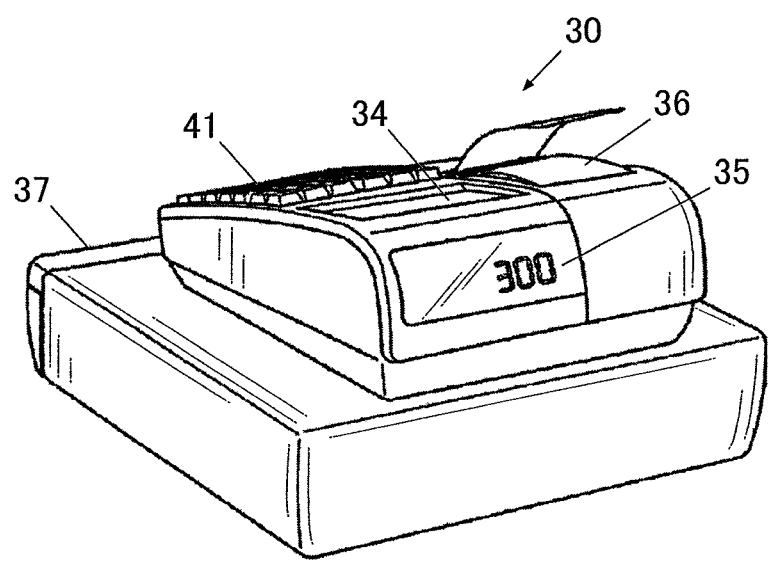

As shown in FIG. 3, FIG. 4A and FIG. 4B, the sales data processing apparatus 30 includes a CPU 31, a RAM 32, a ROM 33, a display unit 34, a customer display unit 35, a printer 36, a drawer 37, a narrow area communication unit 38, a wide area communication unit 39, a storage 40, an input unit 41 and a mode switch 42.

The CPU 31 controls the components of the sales data processing apparatus 30. The CPU 31 reads a specified program (s) among various programs from the ROM 33, opens the read programs) in the RAM 32, and performs a process(es) among various processes in cooperation with the opened program(s).

The RAM 32 is, for example, a volatile semiconductor memory, and forms a work area to store various data and programs.

The ROM 33 is a read only memory to store various data and various programs.

As shown in FIG. 4A, the display unit 34 is a display device for an operator or an owner who operates the sales data processing apparatus 30 to see and check displayed contents (information on the monetary amounts of items, the total monetary amount, etc.). The display unit 34 includes a display, such as an LCD or an EL display, and displays images based on display control signals output from the CPU 31.

As shown in FIG. 4B, the customer display unit 35 is a display device for a customer who purchases an item(s) to see and check displayed contents (information on the monetary amounts of items, the total monetary amount, etc.). The customer display unit 35 includes a display, such as an LCD or an EL display, and displays images based on display control signals output from the CPU 31 on its display screen.

The printer 36 is a printer, such as a thermal printer, that prints data of receipts, electronic journals and so forth on paper, such as roll paper, under control of the CPU 31. The printer 36 has a mechanism to cut and then output roll paper after printing.

The drawer 37 is a drawer where cash, merchandise certificates (and/or checks), and so forth are stored. The drawer 37 is opened at the time of, for example, finishing registration of items (i.e. reporting) under control of the CPU 31.

The narrow area communication unit 38 includes an antenna, a demodulating circuit and a signal processing circuit, and performs narrow area wireless communication with the portable terminal 20 by a wireless communication system such as Bluetooth®.

The wide area communication unit 39 includes an antenna, a demodulating circuit and a signal processing circuit, and performs wide area wireless communication with the portable terminal 20 by a wireless communication system such as Wi-Fi®.

The storage 40 is a storage in and from which information can be written and read, and includes a battery backup RAM, a flash memory and/or the like. The storage 40 stores therein the transaction data, information on various types of programming (i.e. setting), and so forth.

The input unit 41 has a keyboard including various function keys, and accepts operator inputs made by pressing the keys and outputs information on the operations to the CPU 31. Examples of the function keys include a numeric keypad, a multiplication key, a subtotal key, a refund key, a PLU (Price Look Up) key, and summing-up keys, such as a sold-by-check (and/or -certificate) key and a sold-by-charge (i.e. -credit) key.

The mode switch 42 is to switch the currently-selected mode of the sales data processing apparatus 30 to the program mode, a refund mode, an OFF mode, the register mode, a calculator mode, a read mode or the report mode.

The program mode is a mode to perform various types of programming (e.g. to program (i.e. set) unit prices of items) in the sales data processing apparatus 30. The refund mode is a mode to perform a refund process. The OFF mode is a mode to perform a process of turning off the sales data processing apparatus 30. The register mode is a mode to perform a register process of registering transaction data on purchased items. The calculator mode is a mode to perform calculation in the same manner as an ordinary calculator. The read mode is a mode to perform a read process of reading (i.e. checking) the registered transaction data. The report mode is a mode to perform a report process of reporting (and resetting) sales for one day after the store is closed on the day.

Among the modes of the sales data processing apparatus 30, the program mode, the register mode and the report mode are each a mode in which (power of) the communication unit (the narrow area communication unit 38 or the wide area communication unit 39) is turned on and wireless communication with the portable terminal 20 is performed. More specifically, the register mode is a mode in which the wide area communication unit 39 is turned on and wireless communication with the portable terminal 20 using the wide area communication unit 39 is allowed but the wireless communication using the narrow area communication unit 38 is prohibited (second mode). The program mode and the report mode are each a mode in which the narrow area communication unit 38 is turned on wireless communication with the portable terminal 20 using the narrow area communication unit 38 is allowed but the wireless communication using the wide area communication unit 39 is prohibited. In the second mode, the wireless communication using the narrow area communication unit 38 is not always prohibited, and at least the wireless communication using the wide area communication unit 39 is to be allowed. The reason why wide area wireless communication with the portable terminal 20 is performed in the register mode is that this makes it easy to take orders with the portable terminal 20 from customers who areaway from the sales data processing apparatus 30. The reason why narrow area wireless communication with the portable terminal 20 is performed in the program mode is that this can avoid, if the register process in the register mode is being performed, using the same wireless (wide area wireless) to perform communication (e.g. to send/receive programming data). The reason why narrow area wireless communication with the portable terminal 20 is performed in the report mode is that the report process cannot be performed unless the drawer 37 is open.

The remaining modes, namely, the refund mode, the OFF mode, the calculator mode and the read mode, are each a mode in which (powers of) the communication units are turned off and no wireless communication with the portable terminal 20 is performed.

Figure 5:
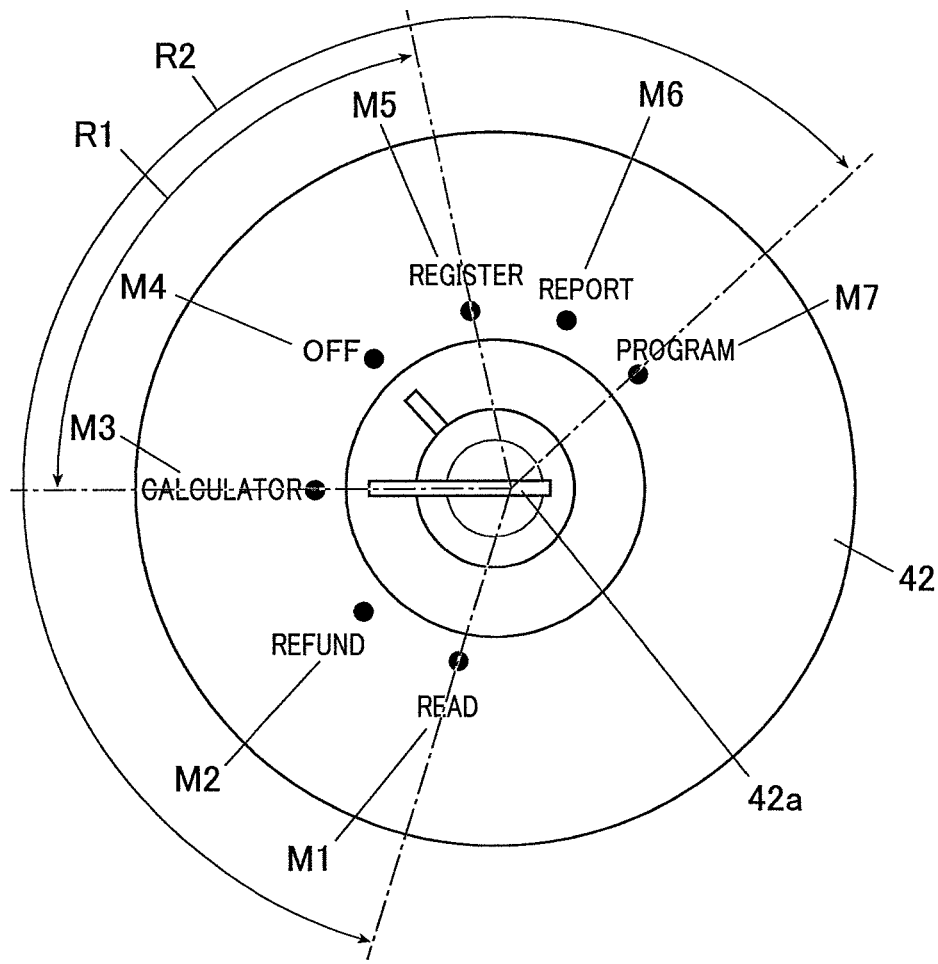
FIG. 5 is a plan view showing a configuration of a mode switch.
Figure 6A:
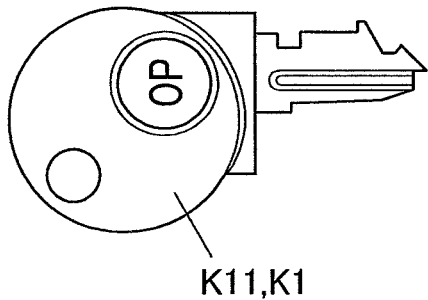
FIG. 6A and FIG. 6B show configurations of mode keys.
Figure 6B:
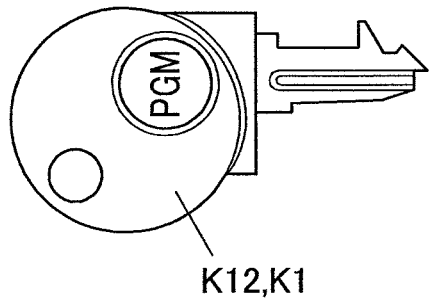

As shown in FIG. 5, the mode switch 42 has a keyhole 42a into which a mode key K1 (FIG. 6A and FIG. 6B) can be inserted. Rotating/Turning the mode key K1 in the state in which the mode key K1 is inserted in the key hole 42a, thereby changing its indicating position, is an operation to select (and set) a mode corresponding to the position. That is, the mode switch 42 is configured such that the inserted mode key K1 is rotatable and a mode corresponding to the position to which the inserted mode key K1 has been rotated (hereinafter called "key-rotated position") is selected.

As the mode key K1, two types of keys, an operator key K11 (FIG. 6A) for the operator and an owner key K12 (FIG. 6B) for the owner, are used.

The mode switch 42 is configured such that a rotatable range of the mode key K1 varies according to the type of the inserted mode key K1. For example, the mode switch 42 is configured to limit the rotatable range of the key if the inserted key is the operator key K11 such that the rotatable range is narrower than that of the owner key K12.

More specifically, the operator key K11 can select any of the OFF mode, the register mode and the calculator mode among the modes of the sales data processing apparatus 30. That is, the operator can activate the OFF mode, the register mode and the calculator mode among the modes of the sales data processing apparatus 30.

Meanwhile, the owner key K12 can select any of all the modes of the sales data processing apparatus 30. That is, the owner can activate all the modes of the sales data processing apparatus 30.

In FIG. 5, "R1" represents the rotatable range of the operator key K11, and "R2" represents the rotatable range of the owner key K12. In the example shown in FIG. 5, the rotatable range R1 of the operator key K11 is set to be in the rotatable range R2 of the owner key K12.

As shown in FIG. 5, in the mode switch 42, the key-rotated positions to select the read mode M1, the refund mode M2, the calculator mode M3, the OFF mode M4, the register mode M5, the report mode M6 and the program mode M7, respectively, are arranged clockwise in this order.

Further, the mode switch 42 is configured such that the mode key K1 can be inserted at a position for the OFF mode M4 only, and cannot be taken out at any position except the position for the OFF mode M4, namely, at positions for the read mode M1, the refund mode M2, the calculator mode M3, the register mode M5, the report mode M6 and the program mode M7. This is applied to both the operator key K11 and the owner key K12.

Hereinafter, for the purpose of illustration, a "key-rotated position to select a mode" may be simply referred to as a "mode".

In this embodiment, the three modes (the calculator mode M3, the OFF mode M4 and the register mode M5) switchable/selectable by the operator key K11 are arranged to be adjacent to one another. Hence, a mode switching/selecting operation(s) by the operator key K11 can be performed without any trouble.

Further, in this embodiment, the key-rotated positions (first key-rotated positions) to select the modes in which the communication unit is turned on and wireless communication with the portable terminal 20 is performed (first modes: the register mode M5, the report mode M6 and the program mode M7), respectively, and the key-rotated positions (second key-rotated positions) to select the modes in which the communication units are turned off and no wireless communication with the portable terminal 20 is performed (second modes: the read mode M1, the refund mode M2, the calculator mode M3 and the OFF mode M4), respectively, are provided. The second key-rotated positions are set in such a way as not to be between the first key-rotated positions. Hence, for example, if switching from a "mode that turns on the communication unit" to another "mode that turns on the communication unit" is performed, because no "mode that turns off the communication units" is arranged therebetween, the mode switching/selecting operation can be performed without unnecessarily turning on and off the communication unit (s).

Further, in this embodiment, key-rotated positions (third key-rotated positions) to select the modes in which the narrow area communication unit 38 is turned on and narrow area wireless communication with the portable terminal 20 is performed (third mode: the report mode M6 and the program mode M7), respectively, are arranged such that, between the key-rotated positions (third key-rotated positions), key-rotated position(s) (a fourth key-rotated position(s)) to select the mode in which the wide area communication unit 39 is turned on and wide area wireless communication with the portable terminal 20 is performed (fourth mode (s): the register mode M5) is not interposed, and vice versa. Hence, for example, if switching from a "mode that turns on the narrow area communication unit 38" to another "mode that turns on the narrow area communication unit 38" is performed, because no "mode that turns on the wide area communication unit 39" is arranged therebetween, the mode switching/selecting operation can be performed without unnecessarily tuning on and off the wide are communication unit 39.

[2. Action]

Action in each mode of the sales data processing apparatus 30 is simply described with reference to FIG. 7. In FIG. 7, the operator key K11 can select any of the calculator mode M3, the OFF mode M4 and the register mode M5, and the owner key K12 can select any of all the modes (the read mode M1, the refund mode M2, the calculator mode M3, the OFF mode M4, the register mode M5, the report mode M6 and the program mode M7). By selecting a desired mode by the operator key K11 or the owner key K12, the mode is performed.

[2-1. Modes in which Communication Units are Turned Off]

The read mode M1, the refund mode M2, the calculator mode M3 and the OFF mode M4 are each the mode in which the communication units (the narrow area communication unit 38 and the wide area communication unit 39) are turned off and no wireless communication with the portable terminal 20 is performed.

Hence, first, the CPU 31 performs a process of turning off the communication units (Step S11, S21, S31 or S41). If the communication units are already off, the CPU 31 does not do anything and proceeds to the next step.

Next, the CPU 31 performs a process corresponding to one of the above modes on the basis of operator or owner operation(s) In the case of the read mode M1, the CPU 31 performs the read process of reading the registered transaction data on the basis of an owner operation(s) (Step S12). In the case of the refund mode M2, the CPU 31 performs the refund process on the basis of an owner operation(s) (Step S22). In the case of the calculator mode M3, the CPU 31 performs the calculator process on the basis of an owner or operator operation(s) (Step S32). In the case of OFF mode M4, the CPU 31 performs the process of turning off the sales data processing apparatus 30 (Step S42).

In Steps S12, S22, S32 and S42, the communication units are off, and hence no beacon to allow establishment of communication with the turned-on communication unit is output.

[2-2. Modes in which Communication Unit is Turned On]

The register mode M5, the report mode M6 and the program mode M7 are each the mode in which the communication unit is turned on and wireless communication with the portable terminal 20 is performed.

Hence, first, the CPU 31 performs a process of turning on either the narrow area communication unit 38 or the wide area communication unit 39. In the register mode M5, the CPU 31 performs a process of turning on the wide area communication unit 39 and also performs a process of turning off the narrow area communication unit 38 (Step S51). In each of the report mode M6 and the program mode M7, the CPU 31 performs a process of turning on the narrow area communication unit 38 and also performs a process of turning off the wide area communication unit 39 (Step S61 or S71).

In the register mode M5, if the wide area communication unit 39 is already on (and the narrow area communication unit 38 is already off), the CPU 31 does not do anything and proceeds to the next step. In each of the report mode M6 and the program mode M7, if the narrow area communication unit 38 is already on (and the wide area communication unit 39 is already off), the CPU 31 does not do anything and proceeds to the next step.

Next, the CPU 31 puts the sales data processing apparatus 30 in a communicable state with an application installed in the portable terminal 20 and outputs a beacon to allow establishment of communication with the turned-on communication unit. In the case of the register mode M5, the CPU 31 puts the sales data processing apparatus 30 in the communicable state with the order entry application installed in the portable terminal 20 and outputs the beacon to allow establishment of communication with the wide area communication unit 39 turned on in Step S51 (Step S52). When receiving the beacon output in Step S52, the portable terminal 20 establishes communication between the wide area communication unit 29 and the wide area communication unit 39 of the sales data processing apparatus 30, which is the sender of the beacon.

In the case of the report mode M6, the CPU 31 puts the sales data processing apparatus 30 in the communicable state with the report application installed in the portable terminal 20 and outputs the beacon to allow establishment of communication with the narrow area communication unit 38 turned on in Step S61 (Step S62). In the case of the program mode M7, the CPU 31 puts the sales data processing apparatus 30 in the communicable state with the program application installed in the portable terminal 20 and outputs the beacon to allow establishment of communication with the narrow area communication unit 38 turned on in Step S71 (Step S72). When receiving the beacon output in Step S62 or Step S72, the portable terminal 20 establishes communication between the narrow area communication unit 28 and the narrow area communication unit 38 of the sales data processing apparatus 30, which is the sender of the beacon.

Next, the CPU 31 performs a process corresponding to one of the above modes.

In the case of the register mode M5, the CPU 31 handles a request for the register process sent from the portable terminal 20 and the manual register process by the operator or the owner with the sales data processing apparatus 30 at the same time (Step S53). That is, if the request sent from the portable terminal 20 is received and the manual registration is performed at the same time, the CPU 31 handles both of them by multi-tasking. The request for the register process sent from the portable terminal 20 is order data sent from the portable terminal 20 to the sales data processing apparatus 30 when the order entry application is started in the portable terminal 20 and the register process is performed by the operator or the owner with the portable terminal 20.

In the case of the report mode M6, after handling the manual report process by the owner with the sales data processing apparatus 30, the CPU 31 sends the sales data to the report application installed in the portable terminal 20 (Step S63). The portable terminal 20 waits to receive the sales data.

In the case of the program mode M7, the CPU 31 handles either a request for the program process sent from the portable terminal 20 or the manual program process by the operator or the owner with the sales data processing apparatus 30 (Step S73). That is, if the request sent from the portable terminal 20 is received and the manual programming is performed at the same time, the CPU 31 handles, by single-tasking, one of them that the CPU 31 accepts earlier. The request for the program process sent from the portable terminal 20 is programming data sent from the portable terminal 20 to the sales data processing apparatus 30 when the program application is started in the portable terminal 20 and the program process is performed by the owner with the portable terminal 20.

[2-3. Report Mode]

Figure 9:
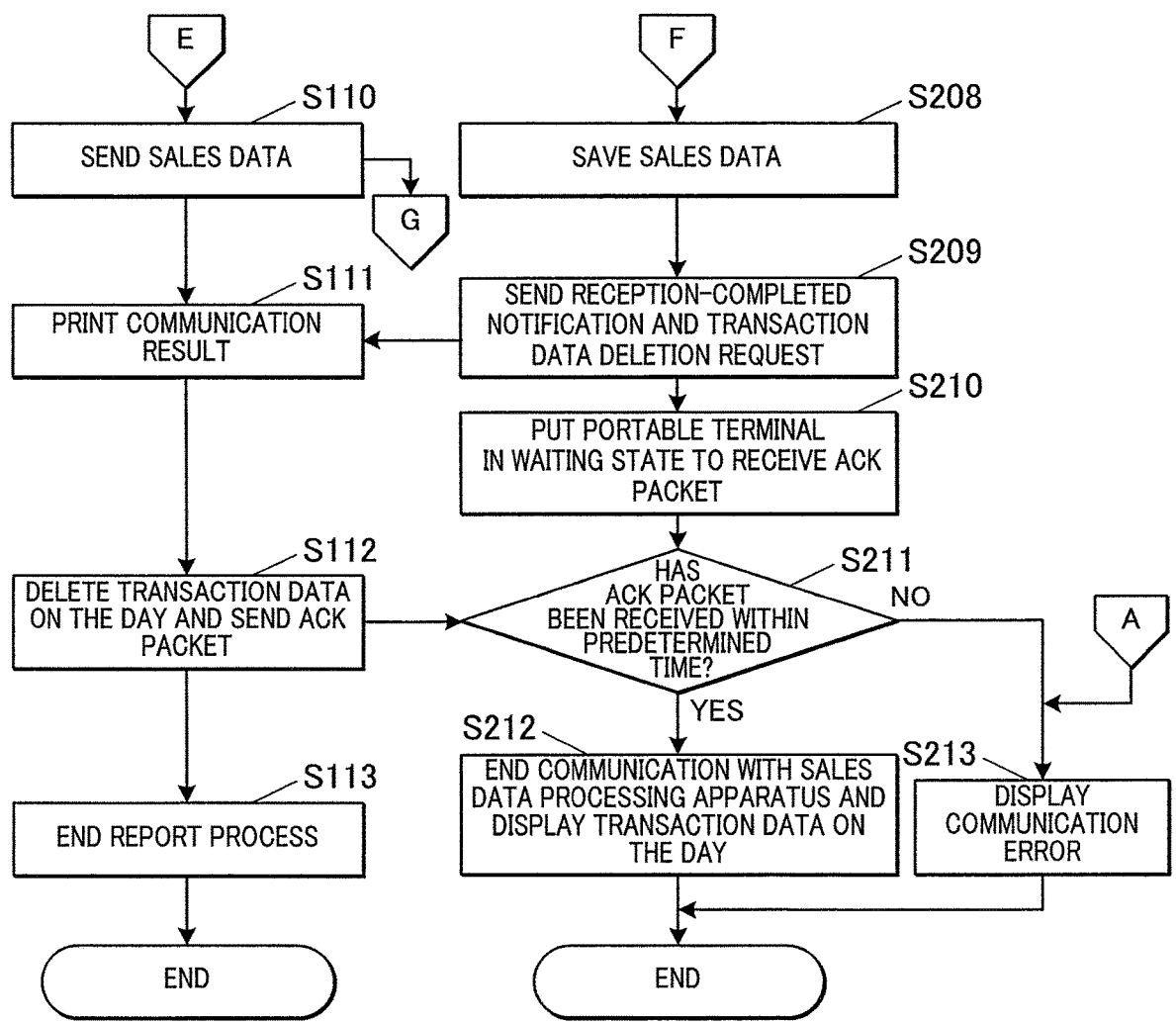
FIG. 9 is a flowchart showing the action in the report mode.

Action in the report mode M6 in the sales data processing system 1 according to this embodiment is described in detail with reference to FIG. 8 and FIG. 9. The action is performed by the owner rotating the owner key K12 to select the report mode M6. In the report mode M6, sales data calculating predetermined transaction data is output.

First, the CPU 31 of the sales data processing apparatus 30 performs the process of turning on the narrow area communication unit 38 (Step S101). If the narrow area communication unit 38 is already on, the CPU 31 does not do anything and proceeds to the next step, namely, Step S102.

Figure 10A:
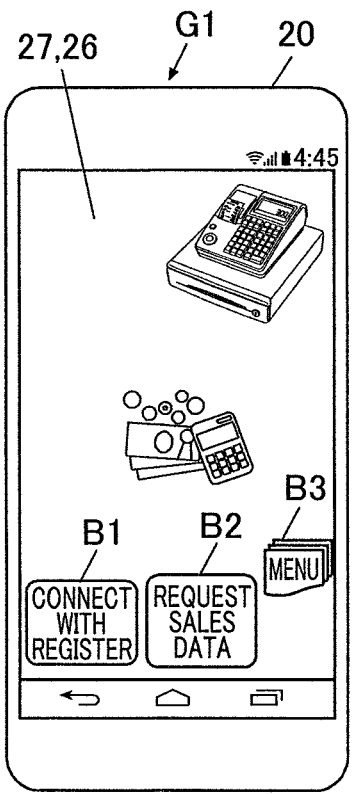
FIG. 10A to FIG. 10E show examples of screens displayed on a display unit of the portable terminal in the report mode.

Meanwhile, the CPU 21 of the portable terminal 20 starts the report application on the basis of an owner operation (touch operation or the like) (Step S201). FIG. 10A shows an example of a start screen G1 displayed on the display unit 27 of the portable terminal 20 when the report application is started in Step S201. The start screen G1 is provided with a connection button B1 for communication connection with the sales data processing apparatus 30, a request button B2 to request the sales data processing apparatus 30 to send the sales data, and a menu button B3 to display a menu screen.

Next, the CPU 31 of the sales data processing apparatus 30 outputs the beacon to allow establishment of communication with the turned-on narrow area communication unit 38 (Step S102).

Meanwhile, the CPU 21 of the portable terminal 20 determines whether or not it has retrieved, within a predetermined time, the beacon output from the sales data processing apparatus 30 in Step S102 on the basis of an owner touch operation on the connection button B1 on the start screen G1 (Step S202). In Step S202, the predetermined time is, for example, ten seconds.

Figure 10B:
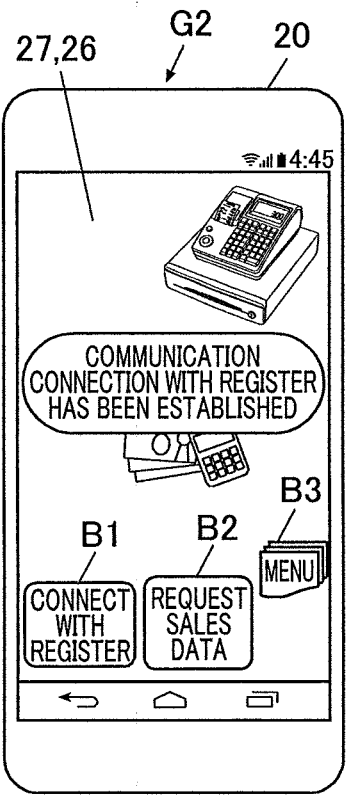

When determining that it has retrieved, within the predetermined time, the beacon output from the sales data processing apparatus 30 in Step S102 (Step S202; YES), the CPU 21 displays a screen (a communication connection screen G2) indicating that communication connection with the sales data processing apparatus 30 has been established on the display unit 27 (FIG. 10B), and then proceeds to Step S203. That is, the CPU 21 functions as a first display control section of the present invention.

Figure 10C:
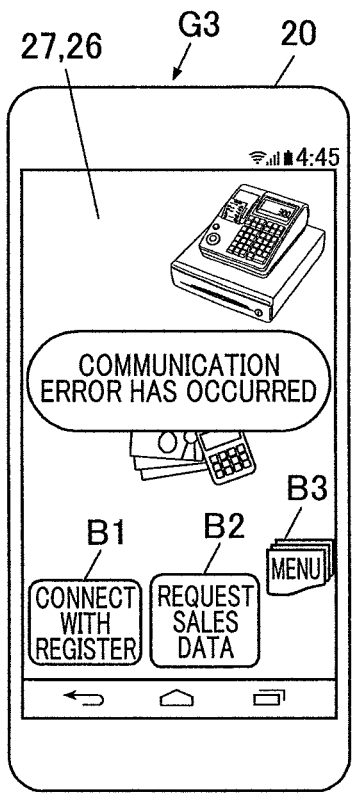

On the other hand, when determining that it has not retrieved, within the predetermined time, the beacon output from the sales data processing apparatus 30 in Step S102 (Step S202; NO), the CPU 21 displays a communication error screen G3 on the display unit 27 (Step S213) as shown in FIG. 10C.

Next, the CPU 21 of the portable terminal 20 sends, to the sales data processing apparatus 30, a sales data request (a sending request) to request the sales data processing apparatus 30 to send the sales data on the basis of an owner touch operation on the request button B2 on the start screen G1 (Step S203).

Figure 10D:
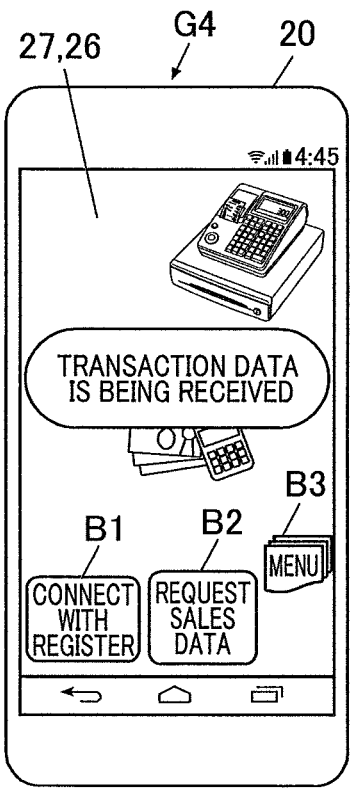

Next, the CPU 21 puts the portable terminal 20 in a waiting state to receive the sales data that is sent from the sales data processing apparatus 30 (Step S204). FIG. 10D shows an example of a screen (a waiting-to-receive screen) G4 displayed on the display unit 27 of the portable terminal 20 when the portable terminal 20 is put in the waiting state to receive the sales data in Step S204.

When receiving the sales data request sent from the portable terminal 20 in Step S203, the CPU 31 puts the sales data processing apparatus 30 in the communicable state with the report application installed in the portable terminal 20 (Step S103). That is, the CPU 31 functions as the controlling unit of the present invention by performing the process of steps S101 and S102.

Next, the CPU 31 of the sales data processing apparatus 30 sends a WACK packet to the portable terminal 20 so that the portable terminal 20 stays in the waiting state to receive the sales data (Step S104).

Next, the CPU 31 of the sales data processing apparatus 30 opens the drawer 37 and sends a WACK packet to the portable terminal 20 (Step S105).

Next, the CPU 31 of the sales data processing apparatus 30 determines whether or not it has obtained, within a predetermined time, a monetary amount in the drawer 37 input by an owner operation (Step S106). In Step S106, the predetermined time is, for example, five seconds.

When determining that it has obtained, within the predetermined time, the monetary amount in the drawer 37 input by the owner operation (Step S106; YES), the CPU 31 proceeds to Step S108.

On the other hand, when determining that it has not obtained, within the predetermined time, the monetary amount in the drawer 37 input by the owner operation (Step S106; NO), the CPU 31 sends a WACK packet to the portable terminal 20 (Step S107) and returns to Step S106.

Next, the CPU 31 of the sales data processing apparatus 30 determines whether or not the printer 36 has printed a sales report on a receipt sheet within a predetermined time on the basis of the sales data obtained by aggregating predetermined transaction data (the transaction data on the day) registered in the register mode M5 (Step S108). In Step S108, the predetermined time is, for example, five seconds. Here, the CPU 31 causes the printer 36 to print a difference between a monetary amount in the drawer 37 calculated from the transaction data or the like and the actual monetary amount in the drawer 37 obtained in Step S106. FIG. 11 shows an example of a printed sales report 361. In the example shown in FIG. 11, date and time, the number of sold items and a sales amount at each department, a gross sales amount, a net sales amount, a cash in drawer amount, the difference between the calculated monetary amount in the drawer 37 and the actual monetary amount in the drawer 37, and so forth are printed.

When determining that the printer 36 has printed the sales report within the predetermined time (Step S108; YES), the CPU 31 proceeds to Step S110.

On the other hand, when determining that the printer 36 has not printed the sales report within the predetermined time (Step S108; NO), the CPU 31 sends a WACK packet to the portable terminal 20 (Step S109) and returns to Step S108.

Next, the CPU 31 of the sales data processing apparatus 30 sends the sales data to the portable terminal 20 (Step S110).

In Step S205, the CPU 21 of the portable terminal 20 determines whether or not the portable terminal 20 has received data within a predetermined time after Step S204. In Step S205, the predetermined time is, for example, ten seconds.

When determining that the portable terminal 20 has received data within the predetermined time (Step S205; YES), the CPU 21 proceeds to Step S206.

On the other hand, when determining that the portable terminal 20 has not received data within the predetermined time (Step S205; NO), the CPU 21 determines that an error of some kind has occurred in the sales data processing apparatus 30 and displays the communication error screen G3 (FIG. 10C) on the display unit 27 (Step S213).

Next, the CPU 21 of the portable terminal 20 determines whether or not the data received in Step S205 is a WACK packet (s) (the WACK packet (s) sent in any of Steps S104, S105, S107 and S109) (Step S206).

When determining that the data received in Step S205 is a WACK packet(s) (Step S206; YES), the CPU 21 returns to Step S205.

On the other hand, when determining that the data received in Step S205 is not a WACK packet (s) (Step S206; YES), the CPU 21 proceeds to Step S207.

Next, the CPU 21 of the portable terminal 20 determines whether or not the data received in Step S205 is the sales data (the sales data sent in Step S110) (Step S207).

When determining that the data received in Step S205 is the sales data (Step S207; YES), the CPU 21 proceeds to Step S208.

On the other hand, when determining that the data received in Step S205 is not the sales data (Step S207; NO), the CPU 21 returns to Step S205.

In Step S208, the CPU 21 of the portable terminal 20 saves, in the RAM 22 or the ROM 23, the sales data sent from the sales data processing apparatus 30 in Step S110.

Next, the CPU 21 of the portable terminal 20 sends, to the sales data processing apparatus 30, a reception-completed notification indicating that reception of the sales data has been completed and a transaction data deletion request to request the sales data processing apparatus 30 to delete the transaction data (Step S209).

Next, the CPU 21 puts the portable terminal 20 in the waiting state to receive an ACK packet (acknowledgement) that is sent from the sales data processing apparatus 30 (Step S210).

Figure 12:
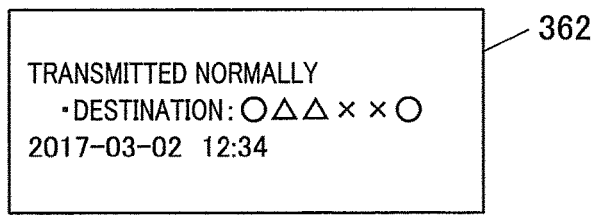
FIG. 12 shows an example of a printed communication result.

The CPU 31 of the sales data processing apparatus 30 causes the printer 36 to print, on the receipt sheet, a communication result based on the reception-completed notification and the transaction data erase request sent (as a response) from the portable terminal 20 in Step S209 (i.e. sending result information indicating that the sales data has been sent) (Step S111). FIG. 12 shows an example of the sales report 362 with the communication result printed. In the example shown in FIG. 12, a message of normal sending ("succeeded in sending"), the portable terminal 20 ("○△△xx○") as a destination, and sent date and time ("2017/3/2 12:34") are printed.

Next, the CPU 31 of the sales data processing apparatus 30 deletes the transaction data on the day (sales data) and sends an ACK packet to the portable terminal 20 (Step S112).

The CPU 21 of the portable terminal 20 determines whether or not the portable terminal 20 has received the ACK packet within a predetermined time after Step S210 (Step S211). In Step S211, the predetermined time is, for example, ten seconds.

When determining that the portable terminal 20 has received the ACK packet within the predetermined time (Step S211; YES), the CPU 21 proceeds to the next step, namely, Step S212.

On the other hand, when determining that the portable terminal 20 has not received the ACK packet within the predetermined time (Step S211; NO), the CPU 21 determines that an error of some kind has occurred in the sales data processing apparatus 30 and displays the communication error screen G3 (FIG. 10C) on the display unit 27 (Step S213).

Next, the CPU 31 of the sales data processing apparatus 30 ends the report process (Step S115).

Figure 10E:
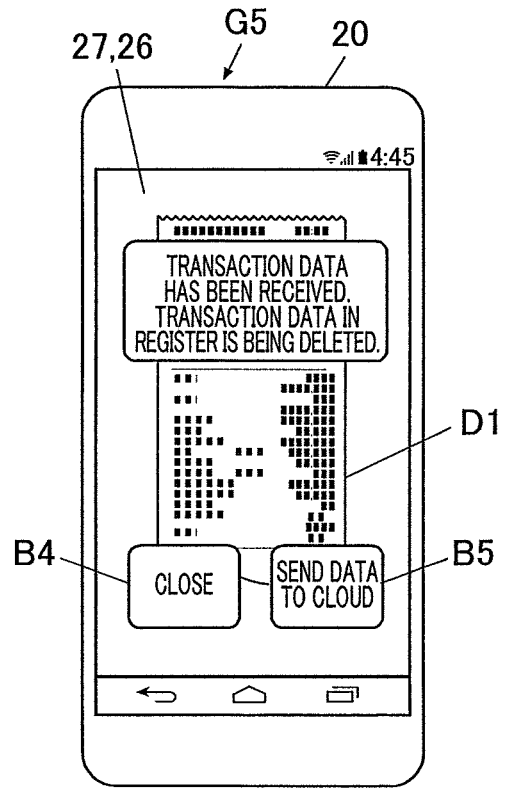

Meanwhile, the CPU 21 of the portable terminal 20 ends the communication (narrow area communication) with the sales data processing apparatus 30 and displays, on the display unit 27, a data display screen G5 (FIG. 10E) to display the transaction data on the day on the basis of the sales data sent from the sales data processing apparatus 30 in Step S110 (Step S212).

On the data display screen G5, the transaction data D1 on the day is displayed. In the example shown in FIG. 10E, the transaction data D1 on the day is displayed in the form of image data, but not limited thereto. The transaction data D1 on the day may be displayed in the form of text data. Further, the data display screen G5 is provided with a closing button B4 to close the data display screen G5 and a sending button B5 to send the transaction data on the day to a cloud (the server apparatus 10). The CPU 21 thereafter sends the sales data to the server apparatus 10 as needed (i.e. when, on the data display screen G5, a touch operation on the sending button B5 is performed), and then ends the report application. The sales data may be sent to the server apparatus 10 in the form of CSV data or PDF data. Further, as another method for sending the sales data to the server apparatus 10, the sales data may be sent by email. In this case, in which the method of sending the sales data by email is employed, too, the sales data may be sent in the form of CSV data or PDF data.

[2-4. Description of Register Mode]

The operation of the register mode M5 in the sales data processing system 1 of the present embodiment is described in detail with reference to FIG. 13 to FIG. 16. The operation is performed when the owner rotates the owner key 12K or when the operator rotates the operator key K11 to switch to the register mode M5. In the register mode M5, the process to register the transaction data is performed.

First, the CPU 31 of the sales data processing apparatus 30 performs the process to turn on the power of the wide area communication unit 39 (step S301). When the power of the wide area communication unit 39 is already turned on, no operation is performed, and the process advances to the next step S302.

The CPU 21 of the portable terminal 20 starts the order entry application (register application) based on operation by the owner or the operation (touch operation, etc.) (step S401).

Next, the CPU 21 of the portable terminal 20 transmits the register start request to request the start of the register process to the sales data processing apparatus 30 (step S402).

The CPU 31 of the sales data processing apparatus 30 receives the register start request transmitted from the portable terminal 20 in step S402, and is in a state communicable with the order entry application installed in the portable terminal 20 (step S302). That is, the CPU 31 performs the process of step S301 and step S302 to function as the control unit of the present invention.

Next, the CPU 21 of the portable terminal 20 performs a first transmitting process based on the operation by the owner or the operator (input operation, touch operation, etc.) (step S403). Specifically, the first transmitting process is a process performed when guided to the seat, and is a process to transmit to the sales data processing apparatus 30 the terminal ID of the portable terminal 20, and the seat number and number of customers of the guided destination as first register information.

The CPU 31 of the sales data processing apparatus 30 receives the first register information transmitted from the portable terminal 20 in step S403 and performs the first register process (step S303).

Figure 14:
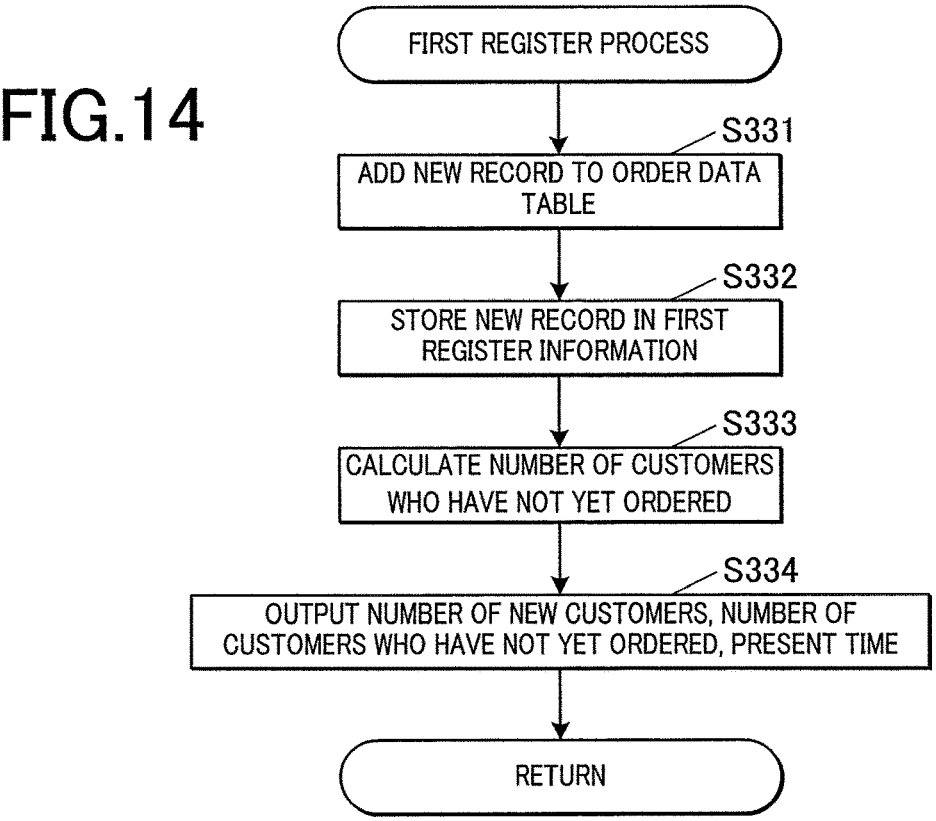
FIG. 14 shows a flowchart showing a first register process.

Specifically, as shown in FIG. 14, the CPU 31 of the sales data processing apparatus 30 adds the new record to the order data table to manage the order data (step S331). For example, the order data table includes fields to store the following, "order ID" which is unique identification information assigned to each order, "code of man in charge" which shows who received the order, "seat number" showing the seat where the man who ordered sits, "number of customers" sitting in the seat, "order information" including detailed information of the order (dish code, amount), and the like.

Next, the CPU 31 stores the first register information transmitted from the portable terminal 20 in step S403 in the new record added in step 331 (step S332).

Next, the CPU 31 extracts the record (non-ordered record) in which order information is not stored yet among all of the records of the order data table, adds the number of customers of the extracted no-order record, and calculates "number of no-order customers" (step S333).

Next, the CPU 31 calculates the number of customers in the new record added in step S331 as "number of new customers" and outputs and displays the "number of new customers", the "number of no-order customers" calculated in step S333, and the present time to the display (not illustrated) of the kitchen (step S334).

According to the first register process, the "number of new customers" and the "number of no-order customers" can be notified to the cooking staff in the kitchen.

Figure 13:
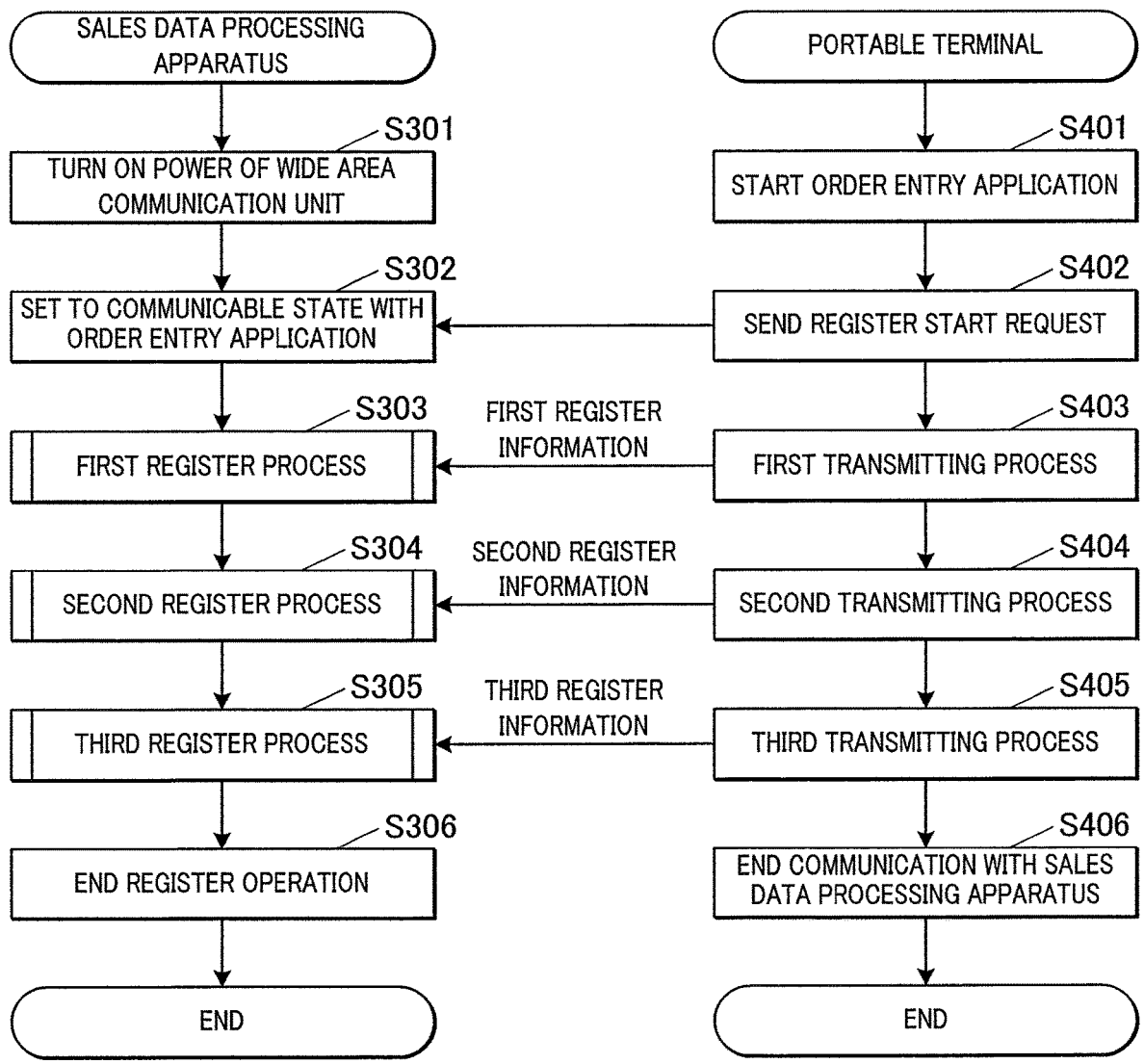
FIG. 13 shows a flowchart showing action in a register mode.

Next, in step S404 of FIG. 13, the CPU 21 of the portable terminal 20 performs the second transmitting process based on the operation by the owner or the operation (input operation, touch operation, etc.). Specifically, the second transmitting process is the process performed when the order is received, and is a process which transmits the terminal ID of the portable terminal 20, the seat number, the dish code and the number of the ordered dishes, to the sales data processing apparatus 30 as the second register information.

The CPU 31 of the sales data processing apparatus 30 receives the second register information transmitted from the portable terminal 20 in step S404 and performs the second register process (step S304).

Figure 15:
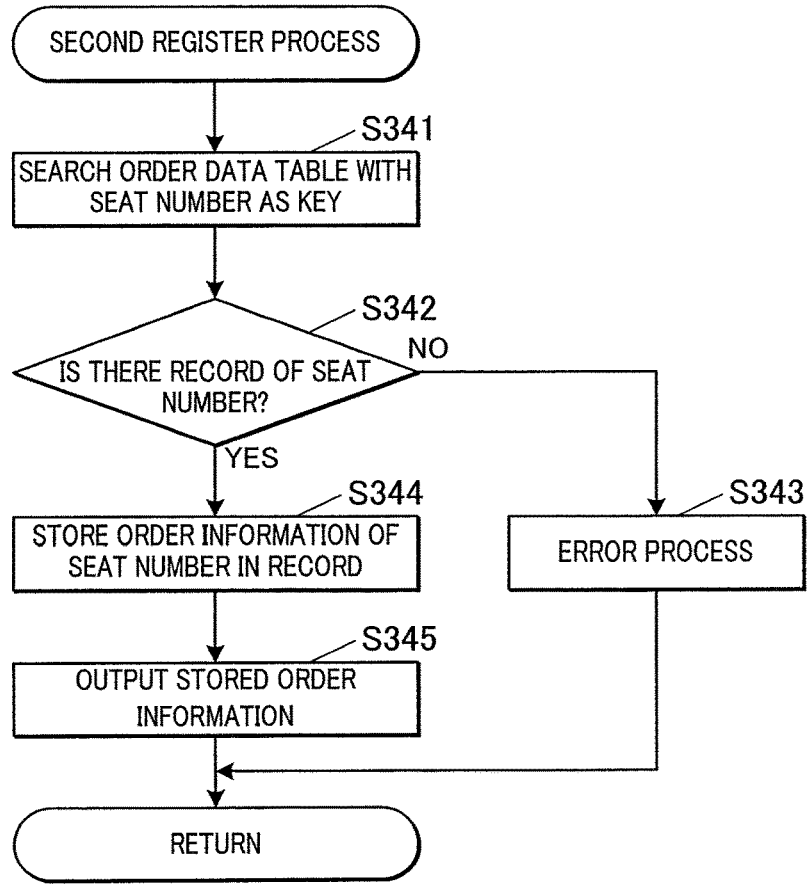
FIG. 15 shows a flowchart showing a second register process.

Specifically, as shown in FIG. 15, the CPU 31 of the sales data processing apparatus 30 searches the order data table with the seat number included in the second register information transmitted from the portable terminal 20 in step S404 as the key (step S341).

Next, the CPU 31 determines whether there is a record with the corresponding seat number in the order data table (step S342).

When it is determined that there is a record with the corresponding seat number in the order data table (step S342: YES), the CPU 31 advances the process to step S344.

When it is determined that there is no record with the corresponding seat number in the order data table (step S342: NO), it is determined that the wrong seat number is transmitted from the portable terminal 20, and the CPU 31 performs the predetermined error process (for example, process to transmit the error message to the portable terminal 20 of the sender) (step S343).

In step S344, the CPU 31 stores the order information transmitted from the portable terminal 20 to the record with the corresponding seat number (dish code and amount).

Next, the CPU 31 outputs the order information stored in step S344 to the printer of the kitchen and prints the information (step S345).

According to the second register process, the "order information" can be notified to the cooking staff in the kitchen.

Next, in step S405 in FIG. 13, the CPU 21 of the portable terminal 20 performs the third transmitting process based on the operation of the owner or the operator (touch operation, etc.). Specifically, the third transmitting process is a process performed when the system is set, and the terminal ID of the portable terminal 20 and the code of the man in charge is transmitted to the sales data processing apparatus 30 as the third register information.

The CPU 31 of the sales data processing apparatus 30 receives the third register information transmitted from the portable terminal 20 in step S405 and performs the third register process (step S305).

Figure 16:
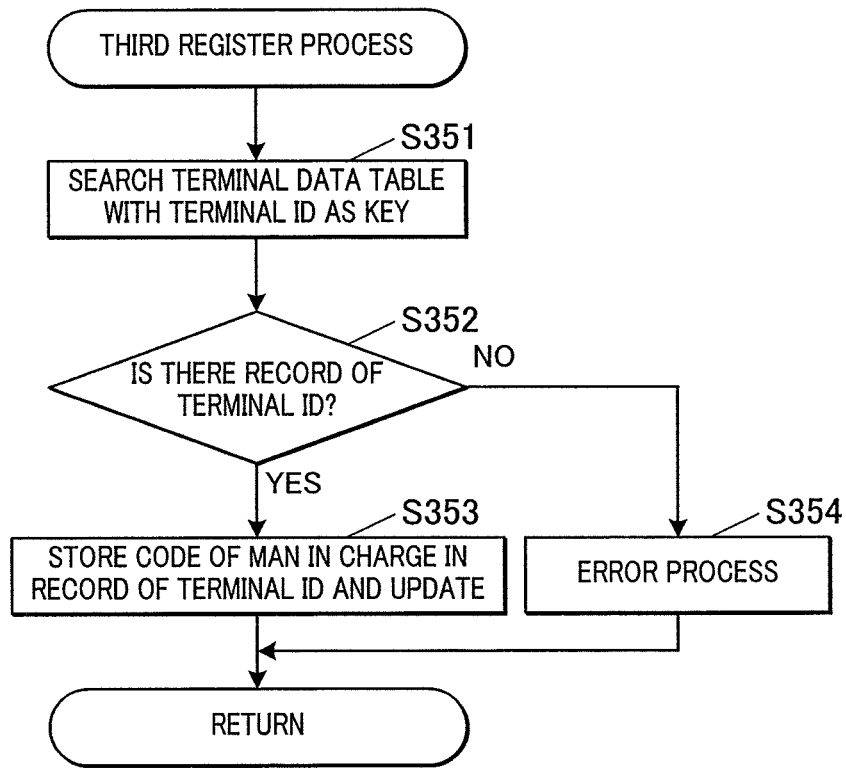
FIG. 16 shows a flowchart showing a third register process.

Specifically, first, as shown in FIG. 16, the CPU 31 of the sales data processing apparatus 30 searches the terminal data table for managing the terminal data to search for the terminal ID included in the third register information transmitted from the portable terminal 20 in step S405 as the key (step S351). The portable data table includes fields such as the "terminal ID (terminal identification information)" which is the identification unique to the portable terminal 20 and "code of man in charge" showing the person carrying the portable terminal 20 at present.

Next, the CPU 31 determines whether there is a record of the corresponding terminal ID in the terminal data table (step S352).

When it is determined that there is a record of the corresponding terminal ID in the terminal data table (step S352: YES), the CPU 31 stores the man in charge code transmitted from the portable terminal 20 in the record of the corresponding ID and updates the record (step S353).

When it is determined that there is no record of the corresponding terminal ID in the terminal data table (step S352: NO), the CPU 31 determines that the wrong terminal ID is transmitted from the portable terminal 20 and the predetermined error process (for example, process to transmit the error message to the portable terminal 20 of the sender) is performed (step S354).

According to the third register process, the information of the man in charge (operator) who operates the operator 20 can be updated.

Normally, the third transmitting process is performed at the timing when the man in charge (operator) who operates the portable terminal 20 changes. Therefore, the process may be performed before the first transmitting process or between the first transmitting process and the second transmitting process. That is, the order that the first transmitting process to the third transmitting process (first register process to third register process) is performed is not limited to the example shown in FIG. 13.

Next, the CPU 31 of the sales data processing apparatus 30 ends the register operation (step S306).

The CPU 21 of the portable terminal 20 ends the communication (wide area communication) with the sales data processing apparatus 30 (step S406). Then, the CPU 21 ends the order entry application.

The example shown in FIG. 13 describes the process to register various register information transmitted from the portable terminal 20 to the sales data processing apparatus 30 but when the manual register process is performed through the input unit 41 of the sales data processing apparatus 30 during the register process, both processes are performed parallel by multi-task according to control by the CPU 31.

[3. Effect]

As described above, the sales data processing apparatus 30 of the sales data processing system 1 according to the present embodiment includes a narrow area communication unit (narrow area communication unit 38) which is able to communicate with a predetermined terminal apparatus (portable terminal 20) by wireless communication limited to a narrow area, a wide area communication unit (wide area communication unit 39) which is able to communicate with a terminal apparatus by wireless communication throughout a wide area, and a mode switch unit (mode switch 42) which switches modes between a first mode in which wireless communication with a terminal apparatus using a narrow area communication unit is allowed while wireless communication with a wide area communication unit is prohibited, and a second mode in which at least wireless communication using a wide area communication unit is allowed, wherein a report mode which outputs sales data adding the predetermined transaction data is assigned to a first mode.

Therefore, according to the sales data processing apparatus 30 of the present embodiment, in the report mode in which the report process cannot be performed without opening the drawer 37, the narrow area wireless communication can be performed with the portable terminal 20. Therefore, the drawer can be opened while operating the portable terminal 20, and communication can be switched between the narrow area wireless communication and the wide area wireless communication according to the characteristics of the mode performing wireless communication with the portable terminal 20.

According to the sales data processing apparatus 30 of the sales data processing system 1, the register mode in which the transaction data is registered is assigned to the second mode.

Therefore, according to the sales data processing apparatus 30 of the present embodiment, in the register mode in which the order of the customer is registered using the portable terminal 20, the wide area wireless communication with the portable terminal 20 can be performed. Therefore, the order of the customer in a position far from the sales data processing apparatus 30 can be registered, and the communication can be switched between the narrow area wireless communication and the wide area wireless communication according to the characteristics of the mode which performs wireless communication with the portable terminal 20.

According to the sales data processing apparatus 30 of the sales data processing system 1 of the present embodiment, the wireless communication with the terminal apparatus using the narrow area communication unit is prohibited in the second mode.

Therefore, according to the sales data processing apparatus 30 of the present embodiment, the transmitting of the data through the narrow area wireless communication and the rewriting of data can be avoided while selecting the register mode in which the order of the customer is registered using the portable terminal 20. With this, the processes in the presently set mode can be performed.

The sales data processing apparatus 30 of the sales data processing system 1 of the present embodiment includes a control unit (CPU 31) which switches the wireless communication with the predetermined terminal apparatus between a first mode in which wireless communication using the narrow area communication unit which is able to perform wireless communication limited to the narrow area is performed, and a second mode in which wireless communication using the wide area communication unit which is able to perform wireless communication throughout the wide area is performed. The report mode which outputs sales data calculating the predetermined transaction data is assigned to the first mode.

Therefore, according to the sales data processing apparatus 30 of the present embodiment, in the report mode in which the report process cannot be performed without opening the drawer 37, the narrow area wireless communication can be performed with the portable terminal 20 and the drawer can be opened while operating the portable terminal 20. With this, the wireless communication can be switched between the narrow area wireless communication and the wide area wireless communication according to the characteristic of the mode which performs wireless communication with the portable terminal 20.

As described above, the present invention is specifically described based on the above embodiment, but the present invention is not limited to the above embodiments and modifications can be made without leaving the scope of the present invention.

For example, according to the present embodiment, the mode selected in the sales data processing apparatus 30 being corresponded to the application started in the portable terminal 20 is described, but the mode selected in the sales data processing apparatus 30 may not be corresponded to the application started in the portable terminal 20.

For example, when the "program application" is started in the state with the "register mode M5" being selected in the sales data processing apparatus 30, the beacon to establish communication with the wide area communication unit 39 output from the sales data processing apparatus 30 cannot be retrieved (received) by the portable terminal 20 desiring narrow area communication. Therefore, communication is not established. In such case, a predetermined error process is performed in the portable terminal 20 (for example, process to display an error message such as "the mode of the sales data processing apparatus 30 does not correspond" on the display unit 27 of the portable terminal 20).

For example, in a state that the "report mode M6" is selected in the sales data processing apparatus 30 and the "program application" is started, the beacon to establish the communication with the narrow area communication unit 38 output from the sales data processing apparatus 30 can be retrieved (received) by the portable terminal 20 desiring narrow area communication. Therefore, the narrow area communication is established. In this case, the program data can be transmitted by the "program application" from the portable terminal 20 even if the reporting process by the "report mode M6" is performed in the sales data processing apparatus 30. Therefore, the program data (for example, merchandise unit price data, etc.) may be rewritten during the report process and this may cause trouble in the report process.

Figure 17:
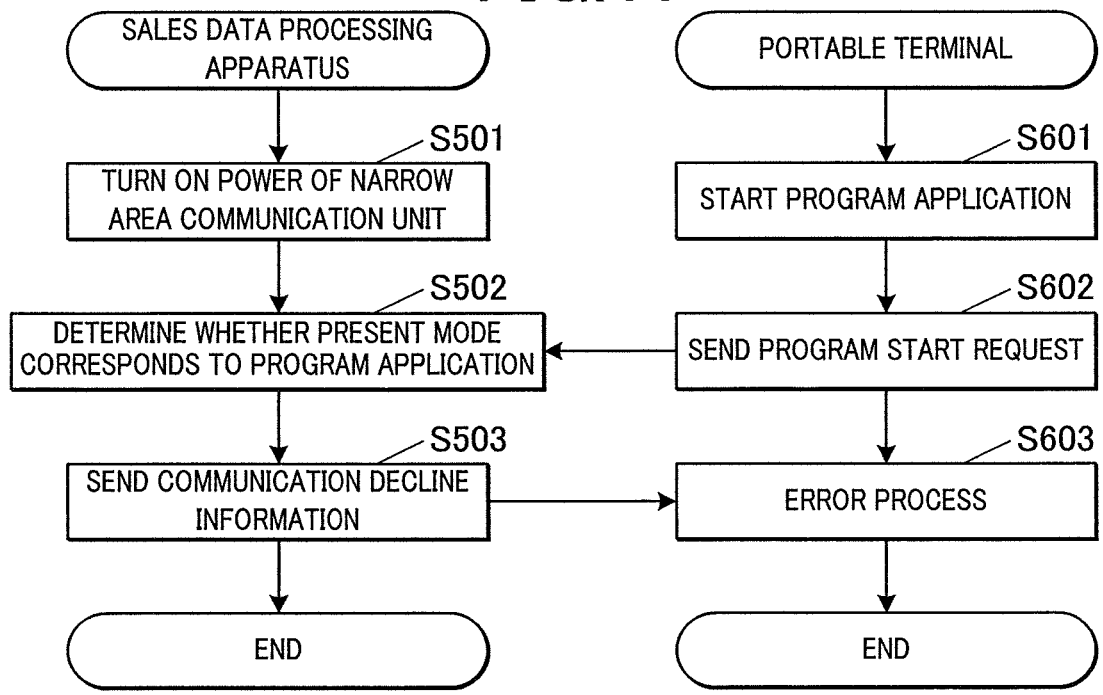
FIG. 17 is a flowchart showing a process performed when wireless communication is established even if a mode in the sales data processing apparatus does not correspond with an application of the portable terminal.

The process performed when the wireless communication is established even if the mode selected in the sales data processing apparatus 30 does not correspond to the application started in the portable terminal 20 is described with reference to FIG. 17. The example described in FIG. 17 is a case when the "program application" is started with the "report mode M6" selected in the sales data processing apparatus 30.

First, the CPU 31 of the sales data processing apparatus 30 performs the process to turn on the power of the narrow area communication unit 38 (step S501). When the power of the narrow area communication unit 38 is already on, no operation is performed, and the process advances to the next step S502.

The CPU 21 of the portable terminal 20 starts the program application based on the operation of the owner (touch operation, etc.) (step S601).

Next, the CPU 21 of the portable terminal 20 transmits the program start request (communication request) to request start of the program process to the sales data processing apparatus 30 (step S602). Here, the program start request includes the identification information (for example, identification number, etc.) of the application (program application) started in the portable terminal 20.

The CPU 31 of the sales data processing apparatus 30 receives the program start request transmitted from the portable terminal 20 in step S202, and performs the process to determine whether the mode (report mode M6) presently set by the mode switch 42 corresponds to the application (program application) started in the portable terminal 20 as the communication destination based on the identification information included in the program start request (step S502).

When it is determined that the presently set mode corresponds to the application of the communication destination, the CPU 31 of the sales data processing apparatus 30 sets the application started in the portable terminal 20 as the communication destination to communicate by narrow area communication or wide area communication depending on the presently set mode, and outputs the beacon to establish communication with the communication unit turned on. When the portable terminal 20 receives the output beacon, the communication with the communication unit of the sales data processing apparatus 30 as the sender is established.

As shown in FIG. 17, when it is determined that the presently set mode (report mode M6) does not correspond to the application of the communication destination (program application), the CPU 31 does not set a state communicable with the application started in the portable terminal 20 as the communication destination and the beacon to establish communication with the communication unit (narrow area communication unit 38) turned on is not output. With this, the portable terminal 20 cannot establish communication with the communication unit of the sales data processing apparatus 30 of the sender.

That is, in step S503, the CPU 31 of the sales data processing apparatus 30 declines wireless communication with the portable terminal 20 as the communication destination and transmits communication decline information to the portable terminal 20.

The CPU 21 of the portable terminal 20 receives the communication decline information transmitted from the sales data processing apparatus 30 in step S503 and performs the predetermined error process (for example, process to display an error message such as "the mode of the sales data processing apparatus 30 does not correspond" on the display unit 27 of the portable terminal 20) (step S603).

As described above, when it is determined whether the presently set mode corresponds to the application based on the identification information of the application started included in the communication request transmitted from the portable terminal 20 and it is determined that the presently set mode corresponds to the application, communication with the portable terminal 20 is possible by narrow area communication or wide area communication depending on the presently set mode. When it is determined that the presently set mode does not correspond to the application, the communication decline information showing that the wireless communication with the portable terminal 20 is declined is transmitted to the portable terminal 20. When the presently set mode does not correspond to the application, the transmission and rewriting of data is not performed. Therefore, the process in the presently set mode can be performed without any problems.

In the above embodiment, after printing the communication result in Step S111 in FIG. 8, the sales data processing apparatus 30 proceeds to Step S112 without informing the portable terminal 20 about printing of the communication result. This is not intended to limit the present invention. That is, after printing the communication result in Step S111, the sales data processing apparatus 30 may send, to the portable terminal 20, a printing-done announcement to inform the portable terminal 20 about printing of the communication result. At the time, the portable terminal 20 may display contents of the communication result printed in Step S111 on the display unit 27.

Further, the sales data processing apparatus 30 and the portable terminal 20 may store the contents of the communication result printed in Step S111 in their storages (the storage 40, the RAM 22, the ROM 23, etc.) as log information.

Further, in the above embodiment, in the mode switch 42, the read mode M1, the refund mode M2, the calculator mode M3, the OFF mode M4, the register mode M5, the report mode M6 and the program mode M7 are arranged in this order. This is not intended to limit the present invention. For example, the read mode M1, the refund mode M2, the calculator mode M3 and the OFF mode M4, in which no wireless communication with the portable terminal 20 is performed, can be arranged in a random order, namely, in any order. Similarly, the report mode M6 and the program mode M7, in which wireless communication performed with the portable terminal 20 is the same (narrow area wireless communication), can be arranged in a random order, namely, in any order, and hence the program mode M7 and the report mode M6 may be arranged clockwise in this order.

Further, for example, the register mode M5, in which the wide area communication unit 39 is turned on and wide area wireless communication with the portable terminal 20 is performed, may be arranged, in the clockwise direction, behind the report mode M6 and the program mode M7, in which the narrow area communication unit 38 is turned on and narrow area wireless communication with the portable terminal 20 is performed.

Further, in the above embodiment, there are three modes (the resister mode M5, the report mode M6 and the program mode M7) each as the mode, which causes the communication unit to be communicable with the portable terminal 20, and four modes (the read mode M1, the refund mode M2, the calculator mode M3 and the OFF mode M4) each as the mode, which causes the communication units to be uncommunicable with the portable terminal 20. This is not intended to limit the present invention. As far as the mode switch 42 has two or more modes including the register mode M5 as the mode, which causes the communication unit to be communicable with the portable terminal 20 and at least one mode as the mode, which causes the communication units to be uncommunicable with the portable terminal 20, the mode switch 42 can have any configuration.

Further, in the above embodiment, the operator key K11 can switch (i.e. select any of) the calculator mode M3, the OFF mode M4 and the register mode M5. This is not intended to limit the present invention. For example, the operator key K11 may further be able to select the read mode M1. In this case, it is preferable that the read mode M1 be arranged at a position to be adjacent to the calculator mode M3, the OFF mode M4 and/or the register mode M5.

Further, the operator key K11 may not be provided (i.e. only the owner key K12 is provided). In this case, the mode switch 42 does not need to be configured such that the rotatable range varies according to the type of the mode key K1, and accordingly can be manufactured readily.

Figure 18:
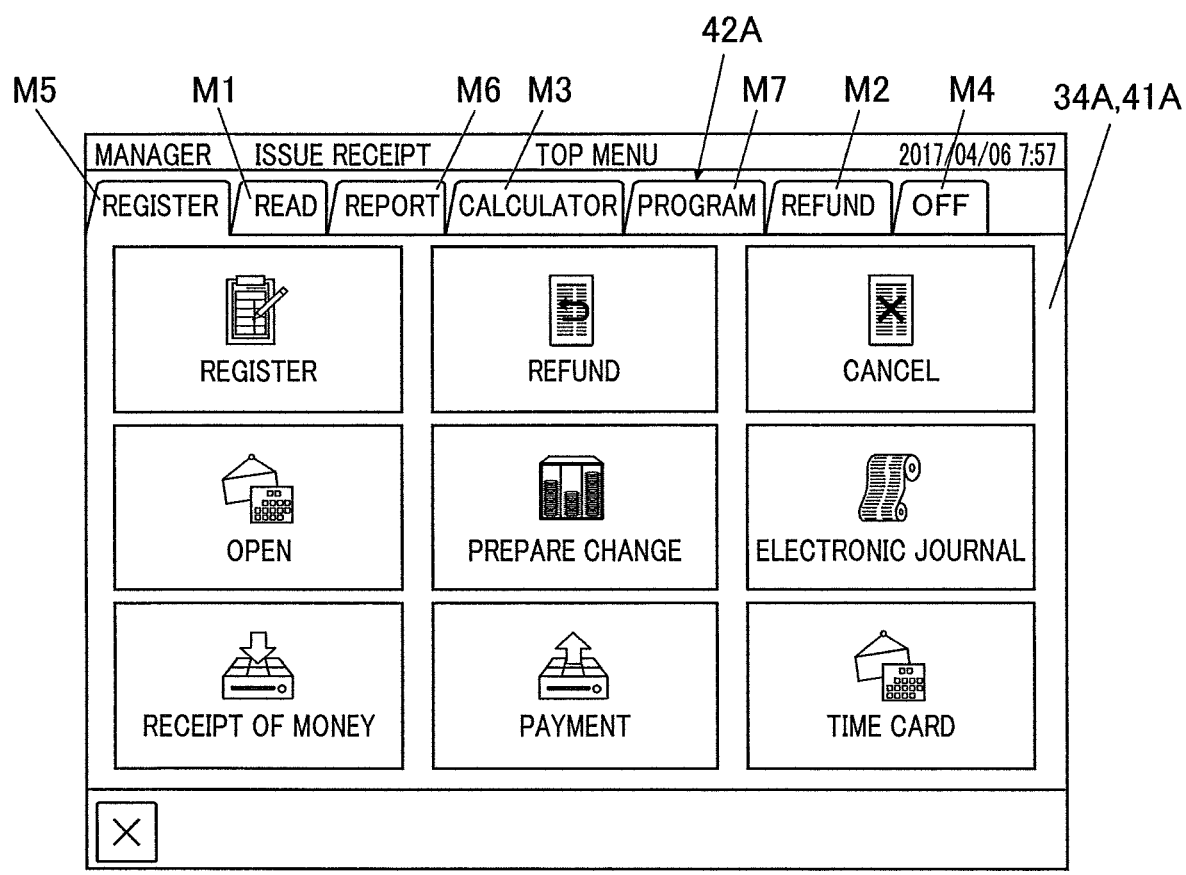
FIG. 18 shows a modification of the configuration of the sales data processing apparatus.

In the above embodiment, as shown in FIG. 4A, FIG. 4B and so forth, the display unit 34, the input unit 41 and the mode switch 42 are provided as individual components. This is not intended to limit the present invention. For example, as shown in FIG. 18, an input unit 41A may be integrated with a display unit 34A, thereby being configured as a touchscreen, and on the display unit 34A, a mode switcher 42A may be displayed instead of the mode switch 42. The mode switcher 42 can switch (i.e. select any of) the modes (the read mode M1, the refund mode M2, the calculator mode M3, the OFF mode M4, the register mode M5, the report mode M6 and the program mode M7) by a tab system. Thus, the display unit 34A, the input unit 41A and the mode switcher 42A can be configured as a single component. This configuration enables mode switching/selecting by a simpler operations).

In the above, as a computer readable medium storing the programs to perform the processes of the present invention, a hard disk, a nonvolatile memory or the like is used. The computer readable medium is not limited thereto, and may be a portable recording/storage medium, such as a CD-ROM. Further, as a medium to provide data of the programs via a communication line, a carrier wave can be used.

Although several embodiments of the present invention are described in the above, the scope of the present invention is not limited thereto, and includes the scope of claims below and the scope of their equivalents.

What is claimed is:

1. A sales data processing apparatus comprising:
   a narrow area communication unit which communicates with a predetermined terminal apparatus by wireless communication limited to a narrow area;
   a wide area communication unit which communicates with the terminal apparatus by wireless communication throughout a wide area; and
   a mode switching unit which switches between a first mode in which wireless communication with the terminal apparatus using the narrow area communication unit is allowed but the wireless communication using the wide area communication unit is prohibited, and a second mode in which at least wireless communication using the wide area communication unit is allowed,
   wherein, a report mode which outputs sales data calculating predetermined transaction data is assigned to the first mode.

2. The sales data processing apparatus according to claim 1, wherein a register mode in which the transaction data is registered is assigned to the second mode.

3. The sales data processing apparatus according to claim 1, wherein wireless communication with the terminal apparatus using the narrow area communication unit is prohibited in the second mode.

4. The sales data processing apparatus according to claim 1, wherein the mode switching unit includes a mode key with which a predetermined mode can be selected and a keyhole in which the mode key can be inserted, wherein the mode key is rotated in a state inserted in the keyhole and when a rotated position of the mode key is switched, the mode is switched corresponding to the rotated position.

5. The sales data processing apparatus according to claim 4, wherein, the mode switching unit is configured so that a rotatable range is different depending on a type of mode key.

6. The sales data processing apparatus according to claim 5, wherein, the type of mode key included in the mode switching unit includes, a first authority key which is able to switch to a rotated position corresponding to a second mode and which is not able to switch to a rotated position corresponding to the first mode, and a second authority key which is able to at least switch to the rotated position corresponding to the first mode.

7. A sales data processing apparatus comprising:
   a controller which switches wireless communication with a predetermined terminal apparatus between a first mode in which wireless communication is performed using a narrow area communication unit which performs wireless communication limited to a narrow area and a second mode in which wireless communication is performed using a wide area communication unit which performs wireless communication throughout a wide area,
   wherein, a report mode which outputs sales data calculating predetermined transaction data is assigned to the first mode.

8. The sales data processing apparatus according to claim 7, wherein a register mode in which the transaction data is registered is assigned to the second mode.

9. The sales data processing apparatus according to claim 7, wherein wireless communication with the terminal apparatus using the narrow area communication unit is prohibited in the second mode.

10. The sales data processing apparatus according to claim 7, wherein the controller includes a mode key with which a predetermined mode can be selected and a keyhole in which the mode key can be inserted, wherein the mode key is rotated in a state inserted in the keyhole and when a rotated position of the mode key is switched, the mode is switched corresponding to the rotated position.

11. The sales data processing apparatus according to claim 10, wherein, the controller is configured so that a rotatable range is different depending on a type of mode key.

12. The sales data processing apparatus according to claim 11, wherein, the type of mode key included in the controller includes, a first authority key which is able to switch to a rotated position corresponding to a second mode and which is not able to switch to a rotated position corresponding to the first mode, and a second authority key which is able to at least switch to the rotated position corresponding to the first mode.

13. A non-transitory computer-readable storage medium having a program stored thereon for controlling a computer used in a sales data processing apparatus, wherein the program controls the computer to perform the following process:
    a control process in which wireless communication with a predetermined terminal apparatus is switched between a first mode in which wireless communication is performed using a narrow area communication unit which performs wireless communication limited to a narrow area and a second mode in which wireless communication is performed using a wide area communication unit which performs wireless communication throughout a wide area,
    wherein, a report mode which outputs sales data calculating predetermined transaction data is assigned to the first mode.

14. The computer-readable storage medium according to claim 13, wherein a register mode in which the transaction data is registered is assigned to the second mode.

15. The computer-readable storage medium according to claim 13, wherein wireless communication with the terminal apparatus using the narrow area communication unit is prohibited in the second mode.

* * * * *